No. 621,140. Patented Mar. 14, 1899.
J. C. REUTER.
BICYCLE SADDLE.
(Application filed May 3, 1897.)
(No Model.) 2 Sheets—Sheet 1.
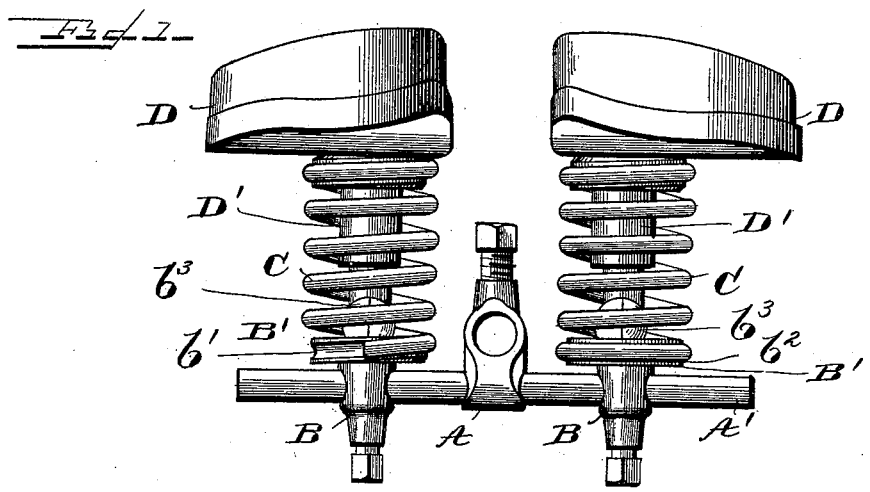
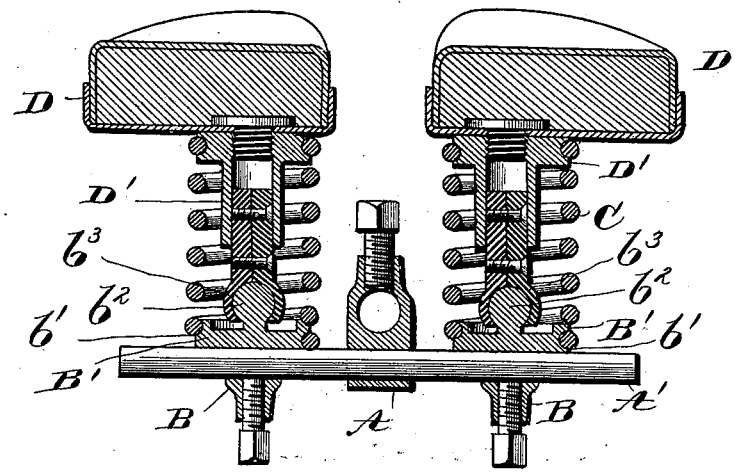

No. 621,140. Patented Mar. 14, 1899.
J. C. REUTER.
BICYCLE SADDLE.
(Application filed May 3, 1897.)
(No Model.) 2 Sheets—Sheet 2.

Witnesses: G. A. Tauberschmidt, J. D. Kingsbury.

Inventor: John C. Reuter, By Whitaker & Prevost, Attys.

THE NORRIS PETERS CO., PHOTO-LITHO., WASHINGTON, D. C.

derside view of a modification of such construction.

UNITED STATES PATENT OFFICE.

JOHN CHAS. REUTER, OF CHICAGO, ILLINOIS, ASSIGNOR TO LE ROY W. STEVENS, OF AUBURN, NEW YORK.

BICYCLE-SADDLE.

SPECIFICATION forming part of Letters Patent No. 621,140, dated March 14, 1899.

Application filed May 3, 1897. Serial No. 634,940. (No model.)

*To all whom it may concern:*

Be it known that I, JOHN CHARLES REUTER, a citizen of the United States, residing at Chicago, in the county of Cook and State of Illinois, have invented certain new and useful Improvements in Bicycle-Saddles; and I do hereby declare the following to be a full, clear, and exact description of the invention, such as will enable others skilled in the art to which it appertains to make and use the same.

My present invention is an improvement in saddles for bicycles; and it consists in certain new constructions and combinations of parts set forth in the following specification.

The best forms in which I have contemplated embodying my invention are illustrated in the accompanying drawings, and my said invention is fully disclosed in the following description and claims.

Figure 3:
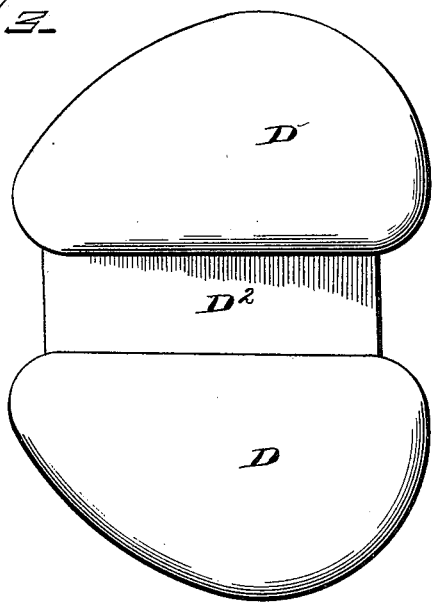
Figure 4:
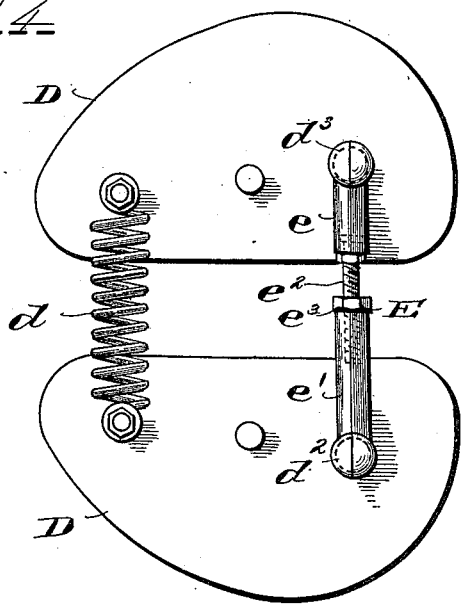

In the drawings, Figure 1 is a rear elevation of my improved saddle with a part of one spring removed. Fig. 2 is a transverse vertical section. Fig. 3 is a plan view of the saddle, showing the two seat-sections united by a flexible connection. Fig. 4 is an underside view of a modification of such construction.

In the said drawings, A indicates the saddle-clip, which is provided with an aperture to receive the horizontal portion of the saddle-post. This clip is provided with the usual set-screw. The clip A is also provided with an aperture at right angles to that which receives the saddle-post, in which is immovably fitted the cross-bar A'. On each side of the clip A is a sleeve B, adjustably mounted on the cross-bar. Each of the saddle-sections is mounted upon and connected to one of these sleeves by a spring C. These springs are of such a strength as to yieldingly support the rider and at the same time permit the seat-sections to move in all directions to accommodate themselves to the movements of the rider in pedaling, forming a universal-joint connection. In order to prevent undue movement on the part of the seat-sections, a stop construction is employed, which is preferably located within the springs. In this instance this stop mechanism is composed of a ball-and-socket construction, which will permit a certain amount of movement in all directions, but prevents that movement from exceeding a certain definite amount.

Above the cross-bar A' each sleeve is expanded into a cylindrical portion B', which is provided with a groove or grooves $b'$, adapted to receive the lower end of one of the spiral springs C. The center of the part B' is provided with a ball $b^2$. This ball is engaged by a socket $b^3$, formed in two parts, united by screws, as I have shown in this instance, or by any other preferred means. The upper portion of the socket $b^3$ is in the form of a short cylinder, which engages and slides freely within a sleeve D', secured to the under side of each seat-section and extending downwardly therefrom. The portion of this sleeve adjacent to the bottom of the saddle-section is enlarged and is provided with an exterior screw thread or threads to receive the upper end of the spiral spring by which it is supported.

Of course it will be understood that the upper part of the socket $b^3$ may be tubular instead of solid, with a saving in weight and material, the important feature being that this device shall telescope or slide within the sleeve D'.

It will be seen that the lower end of the socket $b^3$ is but a short distance from the upper face of the part B', so that on the seat-section and upper end of the spring being moved laterally the lower end of the socket comes in contact with B' and further movement is arrested. This occurs no matter in which direction the movement is made. It will also be seen that this construction within the coils of each spring performs another function, in that it tends to keep the springs in a vertical position and prevents the seat-section from too easily bending downwardly on the outer sides.

I propose also to connect the two seat sections or pads by an elastic connection, so that the lateral movement of either one of the seat-sections shall be resisted not only by its own supporting-spring, but also in part by the supporting-spring of the other section. This construction is shown in Fig. 3, in which D D are the seat sections or pads and $D^2$ the elastic connection. This connection may be of sheet-rubber or woven rubber or elastic material like the "elastic" known in commerce and used in certain classes of manufactures.

I have also contemplated using metallic connections which shall enable the two springs to participate in resisting movement to one side or the other of the bicycle in a greater or less extent, as desired. Metallic connections of this sort are illustrated in Fig. 4, in which D D are the seat sections or pads, which are shown in an inverted position. In this figure the two seat sections or pads are connected at their forward ends by a spring $d$ and at their rear ends by an adjustable link E, connected at each end with the pad by a ball-and-socket construction $d^2$ $d^3$. The two parts of the link $e$ $e'$ are connected by a screw $e^2$, on which there is a jam-nut $e^3$, by which the parts can be adjusted to a greater or less distance apart, as desired. It will be seen that two springs $d$ may be used or two links E, to suit the tastes of different manufacturers and users.

What I claim, and desire to secure by Letters Patent, is—

1. The combination with a support, of a saddle composed of two seat-sections, two springs, each spring connecting one of said sections to said support and permitting each section to move independently in all directions, and a stop device for limiting the movement of each spring and its attached section, substantially as described.

2. The combination with a support, of a saddle composed of two seat-sections, two coiled springs connecting said sections to said support and permitting the independent movement of each section in all directions and a stop for each spring located within the coils of the spring, substantially as described.

3. The combination with a support, of a saddle composed of two seat-sections, two coiled springs connecting said sections to said support, telescoping parts within the springs having a universal connection with said support, substantially as described.

4. In a saddle having two elastically-supported sections movable in all directions, the combination with said sections, of an elastic connecting construction joining said sections, substantially as described.

In testimony whereof I affix my signature in presence of two witnesses.

JOHN CHAS. REUTER.

Witnesses:
   JOHN E. MCWILLIAMS,
   T. O. BROWNING.